United States Patent
Benkreira et al.

(10) Patent No.: US 10,424,170 B1
(45) Date of Patent: Sep. 24, 2019

(54) SYSTEM AND METHOD FOR AN AUTOMATED TELLER MACHINE TO ISSUE A SECURED BANK CARD

(71) Applicant: Capital One Services, LLC, McLean, VA (US)

(72) Inventors: Abdelkader M'Hamed Benkreira, Washington, DC (US); Michael Mossoba, Arlington, VA (US); Joshua Edwards, Philadelphia, PA (US); Carrie Norman, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/054,597

(22) Filed: Aug. 3, 2018

(51) Int. Cl.
*G07F 19/00* (2006.01)
*G06Q 40/02* (2012.01)
*G06Q 20/40* (2012.01)
*G06Q 20/10* (2012.01)

(52) U.S. Cl.
CPC ....... *G07F 19/203* (2013.01); *G06Q 20/1085* (2013.01); *G06Q 20/40145* (2013.01); *G06Q 40/02* (2013.01); *G07F 19/202* (2013.01); *G07F 19/204* (2013.01)

(58) Field of Classification Search
CPC ............ G06Q 20/1085; G06Q 20/355; G06Q 20/4014; G06Q 20/18; G07F 19/20; G07F 19/203
See application file for complete search history.

(56) References Cited

U.S. PATENT DOCUMENTS

| 5,440,108 A * | 8/1995 | Tran ........................ G06Q 20/00 |
| | | 235/380 |
| 6,774,986 B2 * | 8/2004 | Laskowski ............... G07D 7/12 |
| | | 356/394 |
| 7,815,071 B2 * | 10/2010 | Martin ..................... B65H 1/06 |
| | | 221/131 |
| 9,233,812 B2 * | 1/2016 | Martin ..................... B65H 1/28 |

(Continued)

FOREIGN PATENT DOCUMENTS

KR  20160074313 A  *  6/2016

*Primary Examiner* — Christopher Stanford
(74) *Attorney, Agent, or Firm* — Finnegan, Henderson, Farabow, Garrett & Dunner LLP

(57) ABSTRACT

The present disclosure relates to systems and methods for an Automated Teller Machine to issue a secured bank card. An Automated Teller Machine to issue a secured bank card includes one or more memories storing instructions and one or more processors configured to execute instruction to perform operations. The operations include receiving a request for a secured bank card from a user, determining if the user is a current customer, obtaining bank card application information about the user, receiving additional information to confirm the identity of the user, determining if there are already existing accounts tied to the user, transmitting the bank card application information to a server associated with the card issuer, receiving card options the user is qualified for, presenting the card options and instructions to select a cash amount to be remitted, approving, upon receipt of the cash amount, issuance of the secured bank card, creating a unique account for the secured bank card, activating the secured bank card and associating it with the unique account, and dispensing the newly activated secured bank card.

19 Claims, 7 Drawing Sheets

(56) References Cited

U.S. PATENT DOCUMENTS

| | | | | |
|---|---|---|---|---|
| 9,626,678 B2* | 4/2017 | Ovick | .............. | G06Q 20/40145 |
| 2004/0260650 A1* | 12/2004 | Nagaya | .............. | G06Q 20/1085 |
| | | | | 705/43 |
| 2005/0082364 A1* | 4/2005 | Alvarez | ............... | G06Q 20/027 |
| | | | | 235/381 |
| 2007/0152039 A1* | 7/2007 | Bychkov | ............ | G06Q 20/1235 |
| | | | | 235/381 |
| 2010/0123002 A1* | 5/2010 | Caporicci | .............. | G06Q 20/22 |
| | | | | 235/380 |
| 2010/0123003 A1* | 5/2010 | Olson | ................. | G06Q 20/355 |
| | | | | 235/380 |
| 2012/0296811 A1* | 11/2012 | Yuasa | .................... | G07D 11/20 |
| | | | | 705/39 |
| 2017/0116588 A1* | 4/2017 | Conant | ................. | G06Q 20/18 |

\* cited by examiner

SYSTEM AND METHOD FOR AN AUTOMATED TELLER MACHINE TO ISSUE A SECURED BANK CARD

TECHNICAL FIELD

This disclosure relates generally to the field of Automated Teller Machines. More specifically, and without limitation, this disclosure relates to systems and methods for an Automated Teller Machine to dispense a secured bank card.

BACKGROUND

Modern financial transactions often require the use of a credit card. For example, making a purchase online typically requires the use of a credit card. To get a credit card, a user usually fills out and submits an application to a card issuer online, by mail, or in person. The card issuer may then provide a credit card in person to the applicant or, more often, sends the credit card by mail. As part of the application process, the card issuer typically checks the credit history of the applicant. The applicant's credit history will dictate whether the applicant is eligible for a credit card and the credit limit on the credit card. When an applicant has a poor credit history, the card issuer may not approve the applicant for a card. In those situations, the applicant may instead apply for a secured credit card.

A secured bank card is a type of credit card for which the applicant provides a deposit to secure the card. The deposit account serves as security for the card issuer in the event that the applicant fails to make timely payments. Typically, the applicant is required to deposit up to 100% of the desired credit limit. However, the card issuer may lower the deposit required based on the applicant's credit history. To apply for a secured credit card, an applicant must submit an application either on line, in person, or by mail. The applicant must then provide the deposit payment before being issued the card. Often it is difficult for an applicant with poor credit history to find the time to visit a card issuer's physical location to submit an application. Furthermore, when submitting an application online the applicant is required to make a money transfer to provide the deposit payment. Many individuals applying for secured credit cards prefer to make cash payments and cannot do so online.

Currently, an applicant can get a prepaid credit card from certain retail stores. A prepaid credit card is not a true credit card, as there is no credit offered by the card issuer. An applicant therefore cannot build credit by using a prepaid credit card. Certain retail stores also offer secured credit cards that an applicant can apply for in person at the store. However, in these situations the applicant must still go to the retail store location to apply for and receive the card.

Accordingly, there remains a need for improved systems and methods for applying for and receiving a secured credit card.

SUMMARY

In one aspect, there is provided an ATM to issue a secured bank card. The ATM includes a user interface, one or more memories storing instructions, and one or more processors configured to execute the instructions to perform operations. The operations include: receiving, via the user interface, a request from a user for a secured bank card to be issued by a card issuer; determining, by accessing a server associated with the card issuer, if the user previously submitted application information for a secured bank card and, if the user did not previously submit application information, if the user is a current customer of the card issuer; obtaining, if the user did not previously submit bank card application information and is not a current customer, bank card application information about the user; receiving additional information to confirm the identity of the user; determining, if the identity of the user is confirmed, by accessing the server associated with the card issuer, if there are already existing accounts with the card issuer tied to the user; transmitting, if the bank card application information is obtained and the number of existing accounts tied to the user is below a predetermined number, to the server associated with the card issuer, the obtained bank card application information about the user; receiving, from the server associated with the card issuer, one or more options for a secured bank card the user is qualified for based on the bank card application information; presenting to the user, via the user interface, the one or more options with instructions for the user to select among the one or more options for the secured bank card to be issued and a manner by which a cash amount required for the selected option can be remitted; approving, upon receipt of the cash amount for the selected option, issuance of the secured bank card; creating a unique account for the secured bank card; activating the secured bank card and associating the activated bank card with the unique account; and dispensing, if banks cards are available in the ATM, the activated bank card to the user.

In another aspect, there is provided a method for an ATM to issue a secured bank card. The method includes: receiving, at the ATM, a request from a user for a secured bank card to be issued by a card issuer; determining, by accessing a server associated with the card issuer, if the user previously submitted application information for a secured bank card and, if the user did not previously submit application information, if the user is a current customer of the card issuer; obtaining, if the user did not previously submit bank card application information and is not a current customer, bank card application information about the user; receiving additional information to confirm the identity of the user; determining, if the identity of the user is confirmed, by accessing the server associated with the card issuer, if there are already existing accounts with the card issuer tied to the user; transmitting, if the bank card application information is obtained and the number of existing accounts tied to the user is below a predetermined number, to the server associated with the card issuer, the obtained bank card application information about the user; receiving, from the server associated with the card issuer, one or more options for a secured bank card the user is qualified for based on the bank card application information; presenting to the user the one or more options with instructions for the user to select among the one or more options for the secured bank card to be issued and manner by which a cash amount required for the selected option can be remitted; approving, upon receipt of the cash amount for the selected option, issuance of the secured bank card; creating a unique account for the secured bank card; activating the secured bank card stored in the Automated Teller Machine and associating the activated bank card with the unique account; and dispensing, if banks cards are available in the Automated Teller Machine, the activated bank card to the user.

In yet another aspect, there is provided a non-transitory computer-readable medium containing program instructions which, when executed by one or more processors, cause the one or more processors to provide an ATM to issue a secured bank card by performing operations. The operations include: receiving, via the user interface, a request from a user for a secured bank card to be issued by a card issuer; determining, by accessing a server associated with the card issuer, if the user previously submitted application information for a secured bank card and, if the user did not previously submit application information, if the user is a current customer of the card issuer; obtaining, if the user did not previously submit bank card application information and is not a current customer, bank card application information about the user; receiving additional information to confirm the identity of the user; determining, if the identity of the user is confirmed, by accessing the server associated with the card issuer, if there are already existing accounts with the card issuer tied to the user; transmitting, if the bank card application information is obtained and the number of existing accounts tied to the user is below a predetermined number, to the server associated with the card issuer, the obtained bank card application information about the user; receiving, from the server associated with the card issuer, one or more options for a secured bank card the user is qualified for based on the bank card application information; presenting to the user the one or more options with instructions for the user select among the one or more options for the secured bank card to be issued and manner by which a cash amount required for the selected option can be remitted; approving, upon receipt of the cash amount for the selected option, issuance of the secured bank card; creating a unique account for the secured bank card; activating the secured bank card and associating the activated bank card with the unique account; and dispensing, if banks cards are available in the Automated Teller Machine, the activated bank card to the user.

It is to be understood that the foregoing general description and the following detailed description are exemplary and explanatory only and are not restrictive of the disclosed embodiments.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

The disclosed embodiments relate to systems and methods for an Automated Teller Machine to issue a secured bank card. Embodiments of the present disclosure may be implemented using one or more general-purpose computers, e.g., one or more servers, one or more user devices, or the like. Alternatively, or concurrently, one or more special purpose computer may be built according to embodiments of the present disclosure using suitable circuit elements, e.g., one or more application-specific integrated circuits or the like.

Reference will be made in detail to exemplary embodiments and aspects of the present disclose, examples of which are illustrated in the accompanying figures.

Figure 1:
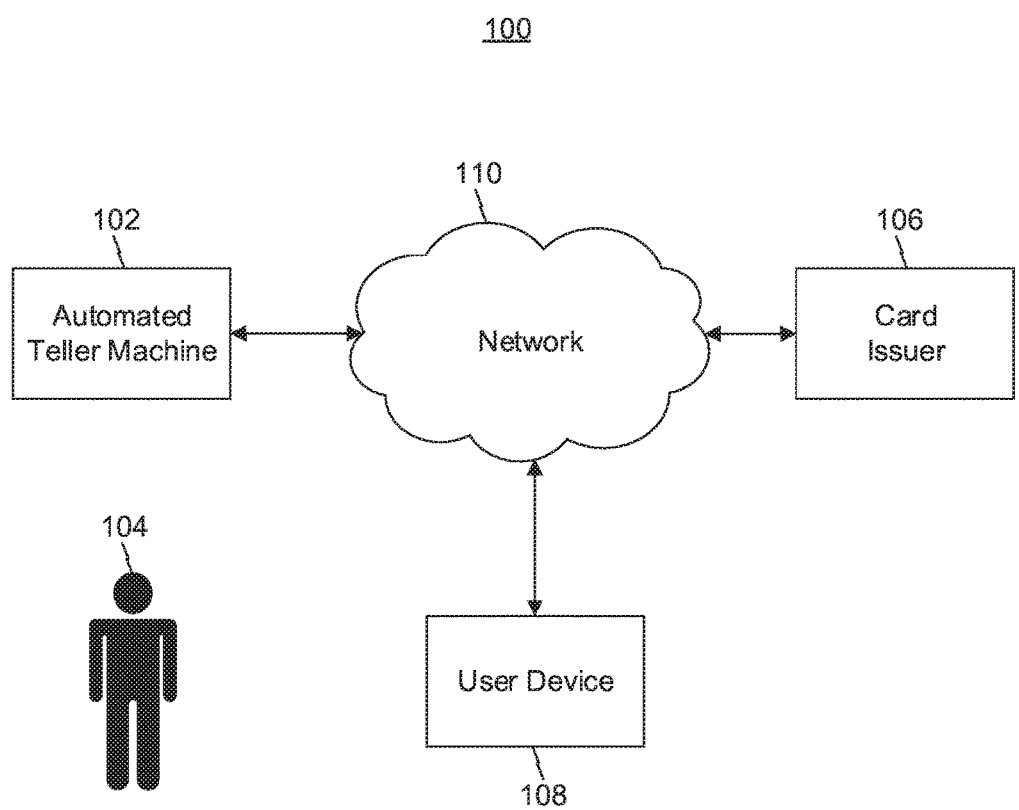
FIG. 1 is a block diagram of an exemplary system including an Automated Teller Machine that issues secured bank cards, consistent with embodiments of the present invention.

FIG. 1 shows an exemplary system 100 including an Automated Teller Machine ("ATM") 102 that issues secured bank cards. System 100 allows a user 104 to connect to a card issuer 106 through ATM 102 or a combination of ATM 102 and a user device 108, by way of a network 110. User 104 may interact with card issuer 106 via a database server with respect to requests received through ATM 102 and user device 108. ATM 102 may be associated with card issuer 106.

User device 108 may be one or more computing devices configured to execute software instructions for performing one or more operations consistent with the disclosed embodiments. In one embodiment, user device 108 may be a mobile device (e.g. tablet, smartphone, etc.), a desktop computer, a laptop, a server, a wearable device (eyeglasses, a watch, etc.), and/or dedicated hardware device. User device 108 may include one or more processors configured to execute software instructions stored in memory, such as memory included in user device 108. User device 108 may include software that, when executed by a processor, performs known Internet-related communication and content display processes. For instance, user device 108 may execute browser software that generates and displays interface screens including content on a display device included in, or connected to, user device 108. The disclosed embodiments are not limited to any particular configuration of user device 108. For instance, user device 108 may be a mobile device that stores and executes mobile applications that provide financial-service-related functions offered by a financial service provider, such as an application associated with one or more financial accounts that a customer (e.g., user 104) holds with a financial service provider.

Card issuer 106 may be a bank, credit union, credit card issuer, or other type of financial service entity that generates, provides, manages, and/or maintains financial service accounts for one or more customers (e.g., user 104). Financial service accounts may include, for example, checking accounts, and any other types of financial service accounts known to those skilled in the art. Financial service accounts may be associated with electronic accounts, such as a digital wallet or similar account that may be used to perform electronic transactions, such as purchasing goods and/or services online or in stores. Financial service accounts may also be associated with physical financial service account cards, such as a debit or credit card that user 104 may carry on their person and use to perform financial service transactions, such as purchasing goods and/or services at a point of sale terminal.

Card issuer 106 includes infrastructure and components that are configured to generate and provide financial service accounts and financial service account cards (e.g., debit cards, credit cards). Card issuer 106 may also include infrastructure and components that are configured to manage transactions associated with a customer service account. In certain aspects, card issuer 106 may provide a primary financial service to a customer, e.g., user 104. For example, card issuer 106 may maintain a credit card account with user 104, in a manner known in the art. In addition to the primary service (e.g., credit card account), card issuer 106 may also provide additional services to user 104 to provide fast in-store purchases. These additional services may include, for example, receiving a transmitted notification, for example through network 110, to complete a transaction. In the present embodiment, card issuer 106 includes a server.

Network 110 may be any type of network configured to provide communications between components of system 100. For example, network 110 may be any type of network (including infrastructure) that provides communications, exchanges information, and/or facilitates the exchange of information, such as the Internet, a Local Area Network, near field communication (NFC), Bluetooth®, Wifi, or other suitable connection(s) that enables the sending and receiving of information between the components of system 100. In other embodiments, one or more components of system 100 may communicate directly through a dedicated communication link(s) (not shown), such as a link between user device 104 and ATM 102.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations of those described herein) will be apparent to persons skilled in the relevant art(s) based on the teachings contained herein. Such alternatives fall within the scope and spirit of the disclosed embodiments.

Figure 2:
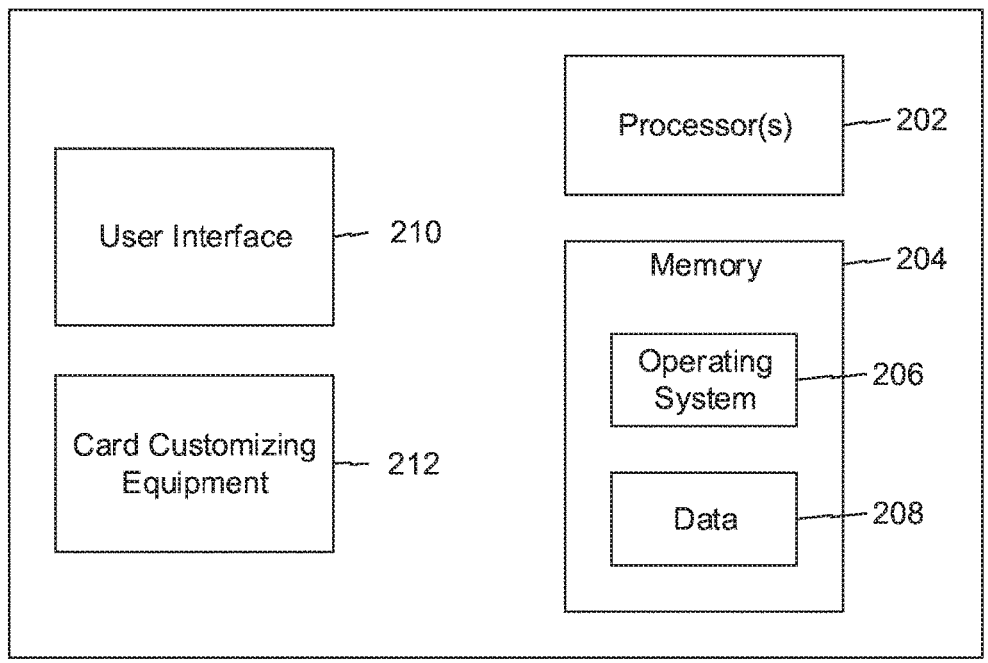
FIG. 2 is a block diagram of an exemplary Automated Teller Machine configured to issue secured bank cards, consistent with embodiments of the present invention.

FIG. 2 is a block diagram of an exemplary ATM 200, which may serve as ATM 102. ATM 200 includes at least one processor 202 configured to execute instructions, and at least one memory 204. Memory 204 further includes at least one program containing instructions 206, and data 208. ATM 200 also includes user interface 210. In some embodiments, ATM 200 may also include card customizing equipment 212.

Processor(s) 202 may include one or more known processing devices, such as a microprocessor from the Core™, Pentium™ or Xeon™ family manufactured by Intel™, the Turion™ family manufactured by AMD™, or the "Ax" or "Sx" family manufactured by Apple™ for example. The disclosed embodiments are not limited to any type of processor(s) otherwise configured to meet the computing demands required of different components of ATM 200.

Memory 204 may be, for example, a magnetic, semiconductor, tape, optical, removable, non-removable, or other type of storage device or tangible (e.g., non-transitory) computer readable medium. Memory 204 may store operating system 206, as well as data and mobile applications for performing operations consistent with functions described below.

Operating system 206 may perform known operating system functions when executed by processor(s) 202. By way of example, operating system 206 may include Android™, Apple OS X™, Unix™, Linux™, or others. Accordingly, examples of the disclosed embodiments may operate and function with computer systems running any type of operating system having an inbuilt messaging application.

User interface 210 may include, for example, interface components such as a graphical user interface or display screen. A display screen may include, for example, a liquid crystal display (LCD), a light emitting diode screen (LED), an organic light emitting diode screen (OLED), a touch screen, or other known display screens. The display screen may display various kinds of information consistent with the disclosed embodiments. User interface 210 may also include, for example, interface components such as physical buttons, a microphone, a camera (still or video), or the like. User interface 210 may further include equipment for obtaining biometric identification information from user 104. Such equipment may include a scanner for obtaining one or more fingerprints from user 104, performing a retinal scan, collecting an audio sample of the voice user 104, etc. User interface 104 may include equipment suitable for collecting any such biometric information that may be useful for facilitating confirming the identity of user 104.

Card customizing equipment 212 may include any device capable of customizing a bank card. For example, card customizing equipment can include an embosser or laser engraver. Card customizing equipment 212 is an optional component of ATM 200 and may be included when ATM 200 is configured to provide customization of secured bank cards at the location.

Figure 3:
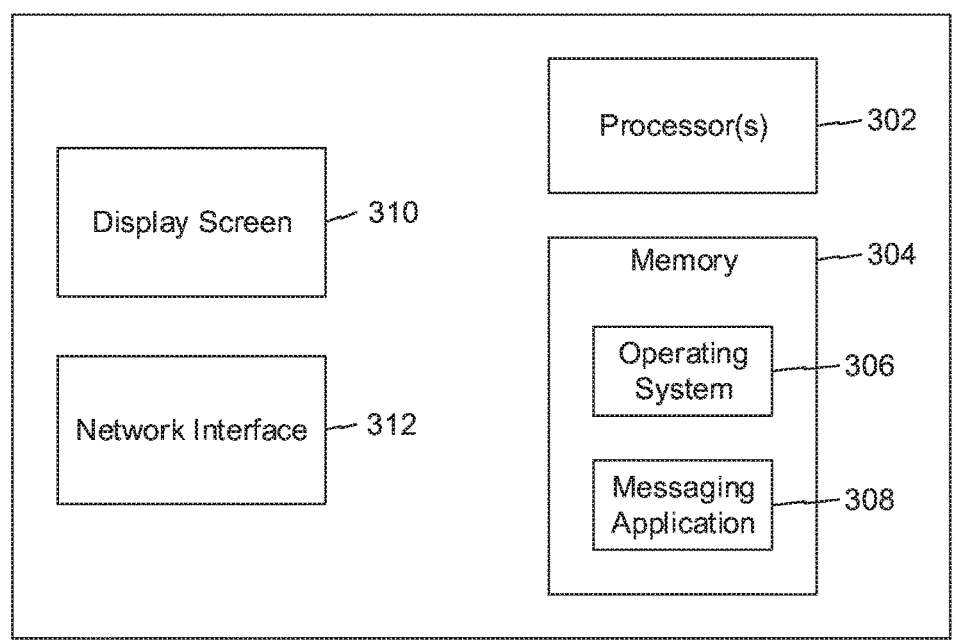
FIG. 3 is a block diagram of an exemplary user device, consistent with embodiments of the present invention.

FIG. 3 is an exemplary block diagram of user device 300, which may serve as user device 108. User device 300 may be a mobile device with computing capabilities, such as a tablet, a smartphone, a wearable device, or any combination of these devices and/or affiliated components. As shown, user device 300 includes at least one processor 302, at least one memory 304 storing one or more operating systems 306 and including an inbuilt messaging application 308, a display screen 310, and a network interface 312.

Processor(s) 302 may include one or more known processing devices, such as a microprocessor from the Core™, Pentium™ or Xeon™ family manufactured by Intel™, the Turion™ family manufactured by AMD™, or the "Ax" or "Sx" family manufactured by Apple™ for example. The disclosed embodiments are not limited to any type of processor(s) otherwise configured to meet the computing demands required of different components of user device 300.

Display screen 310 may include, for example, a liquid crystal display (LCD), a light emitting diode screen (LED), an organic light emitting diode screen (OLED), a touch screen, or other known display screens. Display screen 310 may display various kinds of information consistent with the disclosed embodiments.

Network interface 312 allows user device 300 to send and receive information through network 110. Alternatively, or additionally, network interface 312 may establish direct wired or wireless connection between user device 300 and other system components, such as ATM 102.

Memory 304 may be, for example, a magnetic, semiconductor, tape, optical, removable, non-removable, or other type of storage device or tangible (e.g., non-transitory) computer readable medium. Memory 304 may store operating system 306, as well as data and mobile applications for performing operations consistent with functions described below.

Operating system 306 may perform known operating system functions when executed by processor(s) 304. By way of example, operating system 306 may include Android™, Apple OS X™, Unix™, Linux™, or others. Accordingly, examples of the disclosed embodiments may operate and function with computer systems running any type of operating system having an inbuilt messaging application, such as messaging application 308. Messaging application 308, when executed by processor 304, provides text messaging communication via network 110.

Figure 4:
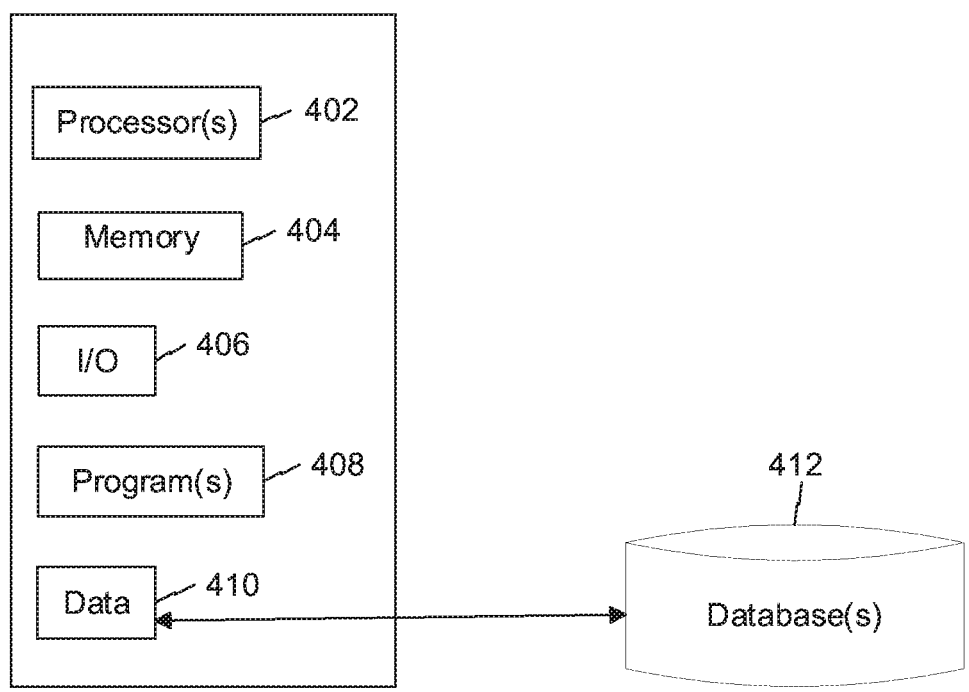
FIG. 4 is a block diagram of an exemplary server, consistent with embodiments of the present invention.

FIG. 4 is an exemplary block diagram of a server 400 for implementing embodiments consistent with the present disclosure. Variations of server 400 may be implemented to serve as card issuer 106.

In one embodiment, server 400 includes one or more processors 402, one or more memories 404, and one or more input/output (I/O) devices 406. According to some embodiments, server 400 may be an embedded system or similar computing device that generates, maintains, and provides web site(s) consistent with disclosed embodiments. Server 400 may be standalone, or it may be part of a subsystem, which may be part of a larger system. For example, server 400 may represent distributed servers that are remotely located and communicate over a network (e.g., network 110) or a dedicated network, such as a LAN. Server 400 may correspond to card issuer 106.

Processor 402 may include one or more known processing devices, such as a microprocessor from the Core™, Pentium™ or Xeon™ family manufactured by Intel™, the Turion™ family manufactured by AMD™, or the "Ax" or "Sx" family manufactured by Apple™, for example. The disclosed embodiments are not limited to any type of processor(s) otherwise configured to meet the computing demands required of different components of server 400.

Memory 404 may include one or more storage devices configured to store instructions used by processor 402 to perform functions related to disclosed embodiments. For example, memory 404 may be configured with one or more software instructions, such as program(s) 408 that may perform one or more operations when executed by processor 402. The disclosed embodiments are not limited to separate programs or computers configured to perform dedicated tasks. For example, memory 404 may include a single program 408 that embodies the functions of server 400, or program 408 could comprise multiple programs. Additionally, processor 402 may execute one or more programs located remotely from server 400. For example, user device 108, ATM 102, and/or card issuer 106, may, via server 400, access one or more remote programs that, when executed, perform functions related to certain disclosed embodiments. Memory 404 may also store data 410 that reflects any type of information in any format that server 400 may use in system 100 to perform operations consistent with the disclosed embodiments.

I/O device 406 may be one or more devices configured to allow data to be received and/or transmitted by server 400. I/O devices 406 may include one or more digital and/or analog communication devices that allow server 400 to communicate with other machines and devices, such as other components of system 100.

Server 400 may also be communicatively connected to one or more database(s) 412. Server 400 may be communicatively connected to database(s) 412 through network 110. Database 412 may include one or more memory devices that store information and are accessed and/or managed through server 400. By way of example, database(s) 412 by include Oracle™ databases, Sybase™ database, or other relational databases or non-relational databases, such as Hadoop sequences files, HBase, or Cassandra. The databases or other files may include, for example, data and information related to the source and destination of a network request, the data contained in the request, etc. Systems and methods of the disclosed embodiments, however, are not limited to separate databases. In one aspect, system 400 may include database 412. Alternatively, database 412 may be located remotely from server 400. Database 412 may include computing components (e.g., database management system, database server, etc.) configured to receive and process requests for data stored in memory devices of database(s) 412 and to provide data from database 412.

Figure 5:
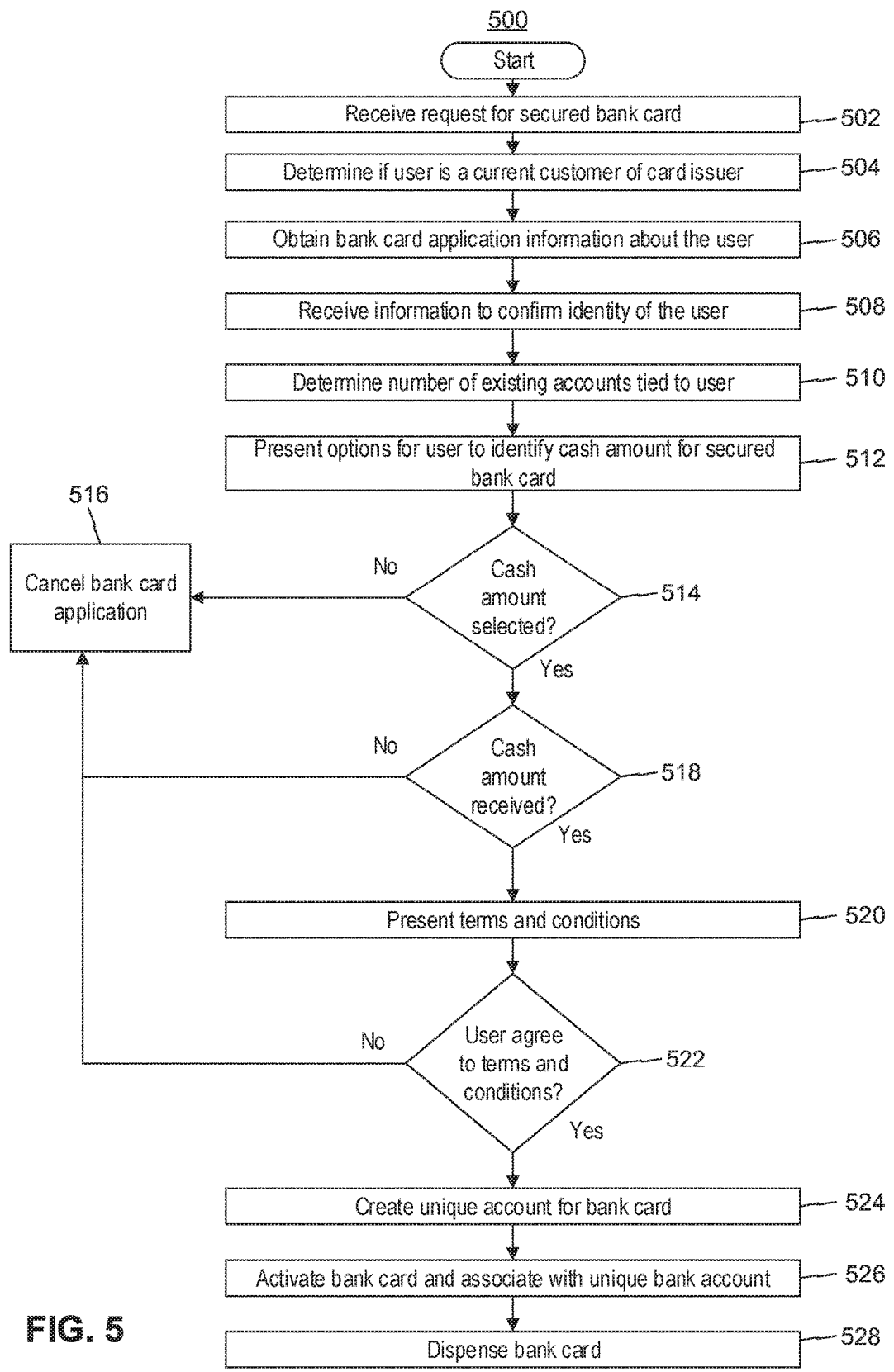
FIG. 5 is a flowchart of an exemplary method for an Automated Teller Machine to issue a secured bank card, consistent with embodiments of the present invention.

FIG. 5 is flowchart of an exemplary method 500 for an ATM to issue a secured bank card, where the user carries out an entire process of applying for and receiving a secured bank card by interaction with ATM 200. Method 500 may be implemented by, for example, processor 202 and user interface 210 of ATM 200 of FIG. 2.

At step 502, ATM 200 receives a request from user 104 through user interface 210 for a secured bank card to be issued by card issuer 106. In some embodiments, ATM 200 may be configured to provide an option for requesting a secured bank card at an initial log-in screen of the user interface 210. For example, ATM 200 may provide a log-in screen on user interface 210 with an option to "Request a Secured Bank Card," without requiring user 104 to insert a bank card into ATM 200 or log-in to an account using other means. In other embodiments, ATM 200 may provide a separate action for requesting a secured bank card using user interface 210. For example, ATM 200 may include a button, or other physical component, the actuation of which serves as a request for a secured bank card. In other embodiments, user 104 may request a secured bank card after inserting their bank card into ATM 200. The bank card may include a physical card or a "virtual card" stored on the user's mobile phone or tablet, e.g., on user device 108. Introducing the bank card to ATM 200 may include inserting a physical card into ATM 200 or using a contactless method such as, for example, radio frequency identification (RFID) or near-field communication (NFC). In this example, introducing a bank card to ATM 200 may give user 104 the ability to access their bank account. Once user 104 has accessed their bank account, user interface 210 may present an option to request a secured bank card through user interface 210, a button, or any other physical component of ATM 200.

In some embodiments, ATM 200 may provide, through user interface 210, a notification that ATM 200 is out of blank bank cards. ATM 200 may prompt user 104, through user interface 210, to choose whether to continue processing the request. In some embodiments, ATM 200 will provide user 104 with instructions as to where the nearest ATM containing blank bank cards is located or where the nearest physical bank associated with card issuer 106 is located. In other embodiments, ATM 200 may inform user 104 that the application can be submitted to card issuer 106 and the requested secured bank card will be sent to user 104 via mail. In other embodiments, ATM 200 may disable the ability to receive requests for secured bank cards until the blank bank cards have been restocked.

At step 504, ATM 200 determines if user 104 previously submitted application information for a secured bank card, and if user 104 did not previously submit application information, ATM 200 determines if user 104 is a current customer of card issuer 106. In some embodiments, ATM 200 may provide a "yes" or "no" question through user interface 210 asking user 104 if they are a current customer of card issuer 106. In other embodiments, ATM 200 may request personal information about user 104. For example, ATM 200 may provide a brief questionnaire through user interface 210 requesting basic information about user 104 such as, for example, name, address, and the like. In other embodiments, ATM 200 may use a camera located on user interface 210 to identify user 104. For example, user 104 may hold a piece of identification, such as a driver's license, in front of the camera. In this example, the camera may record the information necessary to identify the customer and ATM 200 may transfer the information back to a server associated with card issuer 106 to determine if user 104 is a current customer. In still other embodiments, when user 104 requests a secured bank card after inserting a bank card into ATM 200, ATM 200 may determine if user 104 is a current customer based on information from the inserted bank card. In other embodiments, ATM 200 may use personal information from user 104's account to determine if user 104 is a current customer. For example, user 104 may insert a bank card into ATM 200 that is associated with card issuer 106. In this example, method 500 may determine, based on user 104's bank card or account information, that user 104 is a current customer.

At step 506, ATM 200 obtains bank card application information about user 104. Information about user 104 necessary for a bank card application may include user 104's name, address, employment details, income, current loans and credit cards, and the like. In some embodiments, ATM 200 may use information obtained in step 504 to assist in supplying bank card applicant information. For example, ATM 200 may populate required fields such as name, address, and the like that were received at step 504. In another example, when user 104 supplies information to ATM 200 through the camera located on user interface 210 at step 504, ATM 200 may also obtain bank card application information. In other embodiments, ATM 200 may provide, through user interface, a separate screen for entering the bank card application information. For example, ATM 200 may provide this screen through user interface 210 immediately following the screen determining whether user 104 is a current customer of card issuer 106. In other embodiments, where user 104 is determined to be a current customer, card issuer 106 will already have the information about user 104 necessary to fill out a bank card application. In this situation, method 500 may move directly to step 508.

At step 508, ATM 200 receives information necessary to confirm the identity of user 104. In this step, ATM 200 may compare the information provided in steps 504 and 506 with the identity of user 104. By comparing the identity of user 104 with the information submitted at steps 504 and 506, method 500 may reduce instances of fraud and money laundering. In some embodiments, ATM 200 may use biometrics to identify user 104. For example, ATM 200 may use the camera located on user interface 210 to record a photo or video of user 104. In this example, ATM 200 may then compare the photo or video taken from the camera with the scan of user 104's identification. In another example, ATM 200 may transfer the photo or video taken of user 104 to a server associated with a known criminal database to check against existing facial scans. In other embodiments, the biometrics to identify user 104 may include other forms of biometric identification, such as, for example, fingerprinting. In these embodiments, user interface 210 of ATM 200 may be equipped with a fingerprint scanner. ATM 200 may then transfer the fingerprint scan to a server associated with a known criminal database to check against stored fingerprints. In still other embodiments, ATM 200 may require both a photo and fingerprint of user 104 for identification. As explained above, user interface 210 may also include equipment suitable for obtaining other forms of biometric identification information from user 104.

In some embodiments, ATM 200 may require user 104 to enter a phone number as part of step 506 or 508. ATM 200 may use the entered phone number to confirm the identity of user 104. For example, ATM 200 may send a text or push-notification to the phone number with a verification code or a requirement to respond. In other embodiments, ATM 200 may send a message to the telecommunications company associated with the phone number with a request to verify the identity of user 104. In still other embodiments, ATM 200 may use the phone number to geolocate the phone and determine if the phone is within the vicinity of ATM 200.

In other embodiments, ATM 200 may transfer the information submitted to a server associated with card issuer 106, e.g., server 400, to compare the time and geographic location of applications made by user 104. ATM 200 may determine if user 104 is the same user who applied for a previous application using the same identity. ATM 200 may be unable to confirm the identity of user 104 if the same identity has been used in specific time frames and geographic locations. For example, if the identity of user 104 is associated with a first application at 2 PM in Los Angeles and a second application at 2:30 PM in New York City, ATM 200 will be unable to be confirm the identity of user 104 for the second application.

In some embodiments, when the identity of user 104 cannot be confirmed, ATM 200 may cancel the secured bank card application. In other embodiments, when the identity of user 104 cannot be confirmed, ATM 200 may put the application on hold and require user 104 to confirm their identity with card issuer 106. For example, ATM 200 may require user 104 to go to the nearest bank associated with card issuer 106 to confirm their identity. In another example, ATM 200 may require user 104 to call card issuer 106 to confirm their identity. In other embodiments, when the identity of user 104 is confirmed through biometric information, but matches the identity of a known criminal, ATM 200 may cancel the secured bank card application or require user 104 to carry out the application at a bank associated with card issuer 106. For example, if user 104 is identified as a criminal who has been arrested for fraud or money-laundering, ATM 200 may cancel the secured bank card application. In other embodiments, ATM 200 may transfer the information to a server associated with card issuer 106, e.g., server 400, to store the application information for future reference. For example, ATM 200 may transfer biometric information or phone-numbers submitted to server 400 to use for checks against biometric information or phone-numbers submitted in future applications.

At step 510, ATM 200 determines the number of existing accounts tied to user 104. In some embodiments, ATM 200 may transfer the confirmed identify of user 104 to a server associated with card issuer 106, e.g., server 400, to check it against other application requests. ATM 200 may receive, from server 400, information on the number of applications tied to user 104. For example, ATM 200 may transfer biometric information entered by user 104 to the server to be checked against other biometric information entered in one or more previous applications. In this example, if a fingerprint or photo/video of user 104 has previously been submitted, server 400 may identify how many applications have been made using said biometric information and transfer that information to ATM 200. In other embodiments, ATM 200 may display a message on user interface 210 prompting user 104 to enter the number of accounts he or she is tied to. In other embodiments, ATM 200 may transfer the information submitted to server 400 to compare the time and geographic location of applications made by user 104. ATM 200 may determine the number of applications user 104 is tied to. For example, if the identity of user 104 is associated with 5 secured bank card applications made within the same day in Washington, D.C., ATM 200 may determine that user 104 is tied to each of these accounts.

In some embodiments, ATM 200 may cancel the secured bank card application when the number of accounts tied to user 104 is above a predetermined number. For example, if the same biometric information or phone number is associated with user 104 for 10 accounts, user 104 will be tied to these 10 accounts and the current secured bank card application may be canceled. In other embodiments, ATM 200 may put the secured bank card application on hold and require user 104 to either go to a bank associated with, or call, card issuer 106 to discuss the number of accounts tied to their identity. In other embodiments, where an identity associated with user 104 is tied to a predetermined number of accounts opened in a specific period of time and geographic location, ATM 200 may cancel the secured bank card application or put the application on hold. For example, if an identity associated with user 104 has opened 5 accounts within Philadelphia in a 24-hour period, the current application may be cancelled or put on hold.

Method 500 can proceed to step 512 if card issuer 106 approves the application. At step 512, ATM 200 presents user 104, through user interface 210, with one or more options for a secured bank card that user 104 is qualified for based on the bank card application information, along with instructions to choose an option and the manner by which a cash amount required for the selected option may be remitted. In some embodiments, ATM 200 may transfer the bank card application to a server associated with card issuer 106, e.g., server 400. ATM 200 may then receive a list, from the server, of secured bank cards user 104 is eligible for. ATM 200 may provide a screen on user interface 210 prompting user 104 to select the secured bank card option. The options for remitting the cash amount may include a cash deposit, a transfer from another bank account, a transfer from a bank account associated with card issuer 106, or the like. In some embodiments, ATM 200 may provide options for a bank card secured up to the cash amount user 104 chooses to remit. In other embodiments, ATM 200 may provide options for a bank card secured up to a larger amount than the cash amount user 104 chooses to remit. For example, if user 104 is determined to have a credit rating above a predetermined number, ATM 200 may present options through the GUI for user 104 to select a secured bank card with a limit of up to 200% of the cash amount to be remitted.

In some embodiments, ATM 200 may limit the cash amount that can be remitted. For example, card issuer 106 may determine that limiting the cash amount to be remitted to $1,000 will help reduce money laundering and reduce the risk of fraud. In this example, user 104 is limited to remitting a cash amount of $1,000 and may receive a secured bank card with a higher credit limit if user 104's credit rating is above a predetermined number. In other embodiments, the credit limit of the secured bank card may be limited to a predetermined amount. For example, card issuer 106 may limit the credit limit on a secured bank card to $1,000. In this example, user 104 may not receive a secured bank card with a credit limit greater than $1,000, regardless of user 104's credit rating.

At step 514, ATM 200 determines if a cash amount to be remitted has been selected. If no cash amount to be remitted has been selected (step 514—No), the bank card application is cancelled (step 516). If a cash amount to be remitted has been selected (step 514—Yes), then at step 518 ATM 200 determines if the cash amount has been received. If the cash amount has not been received (step 518—No), the bank card application is cancelled (step 516). In some embodiments, the cash amount may be remitted by cash deposit. For example, if user 104 selects a secured bank card with a cash amount of $500 to be remitted, user 104 may deposit that cash amount directly into ATM 200. In some embodiments, ATM 200 may be equipped with a device to scan each bill as it is deposited. ATM 200 may scan each bill to determine if it is counterfeit or if it has been used in an illegal activity. For example, ATM 200 may scan and read the serial number on each bill deposited to the machine. ATM 200 may then transfer the serial number information to a server associated with law enforcement. In this example, if the serial numbers do not match serial numbers of legally printed money, ATM 200 may then cancel the bank card application 516 and report the counterfeit money to the authorities. In another example, ATM 200 may transfer the serial numbers to a server associated with law enforcement to determine whether the bills are associated with illegal activity. In this example, the police may have recorded serial numbers of bills stolen from a bank. ATM 200 may cancel the bank card application (step 516) and report the application, or report the application and allow user 104 to complete the application. In another example, ATM 200 may scan the bills for evidence of illegal activity unrelated to the serial numbers. For example, ATM 200 may scan the bills for ink released during a robbery. ATM 200 may then either cancel the bank card application (step 516) and report the application, or report the application and allow user 104 to complete the application. In other embodiments, ATM 200 may determine the number of bills deposited that are associated with illegal activity. If the number of bills associated with illegal activity is below a predetermined number, ATM 200 may continue the application process. For example, if user 104 deposits $500 worth of $20 bills, and one or two bills are found to be associated with illegal activity, ATM 200 will not cancel or report the bank card application.

If the cash amount has been received, then at step 520 ATM 200 presents the terms and conditions for use of the secured bank card to user 104 via user interface 210. In some embodiments, ATM 200 may prompt user 104 to read the terms and conditions and indicate when completed. For example, ATM 200 may display on user interface 210 the terms and conditions. In this example, user 104 cannot accept the terms and conditions until reaching the bottom of the displayed information. In another example, ATM 200 may provide multiple screens through user interface 210 with various components of the terms and conditions. In this example, user 104 must scroll through each screen before accepting the terms and conditions. In other embodiments, ATM 200 may prompt user 104 to accept or decline the terms and conditions without requiring user 104 to scroll through all the information. Other known methods of presenting the terms and conditions are contemplated herein as well. Although presenting the terms and conditions is shown as step 520 in this exemplary flowchart, in other embodiments the terms and conditions may be presented at earlier stages of method 500. For example, the terms and conditions may be presented before a cash amount is received 518 or a cash amount is selected 514.

At step 522, ATM 200 determines whether user 104 has agreed to the terms and conditions. If user 104 does not agree to the terms and conditions (step 522—No), ATM 200 cancels the bank card application (step 516). If user 104 agrees to the terms and conditions (step 522—Yes), then at step 524 ATM 200 creates a unique account for the secured bank card. Step 524 is carried out using the bank card application information from the previous steps.

At step 526, ATM 200 activates the secured bank card and associates the activated secured bank card with the unique account created at step 524. In some embodiments, ATM 200 is configured to hold a predetermined number of blank bank cards, each including an account number, e.g., a 16-digit number. ATM 200 may read the first blank bank card available and associate the account number on the blank bank card with the newly created unique account. In some embodiments, ATM 200 may issue the newly activated secured card as a temporary card, in which case ATM 200 may provide instructions to user 104 on how to obtain their permanent secured bank card. For example, ATM 200 may inform user 104, through user interface 210, that the permanent secured bank card will be delivered to the address submitted in the application process. In another example, ATM 200 may inform the user of a location to pick up the permanent secured bank card. In other embodiments, ATM 200 may present options to customize the blank bank card. In these embodiments, ATM 200 may be equipped with Card Customizing Equipment 312, which may include an embosser, laser engraver, or other card customizing equipment.

At step 528, ATM 200 dispenses the activated secured bank card. In some embodiments, ATM 200 is configured to dispense bank cards. ATM 200 may then dispense either a temporary or permanent secured bank card through user interface 210. In other embodiments, when ATM 200 has no blank bank cards remaining, it may provide instructions to user 104, through user interface 210, on how to obtain the secured bank card. For example, ATM 200 may provide instructions, through user interface 210, as to the location of an ATM with available bank cards. In this example, ATM 200 may provide user 104 with a passcode to access their application on a separate ATM.

In some embodiments, when ATM 200 is below a predetermined level of blank bank cards, the method may notify card issuer 106 through network 110 that ATM 200 is below the predetermined level.

Figure 6:
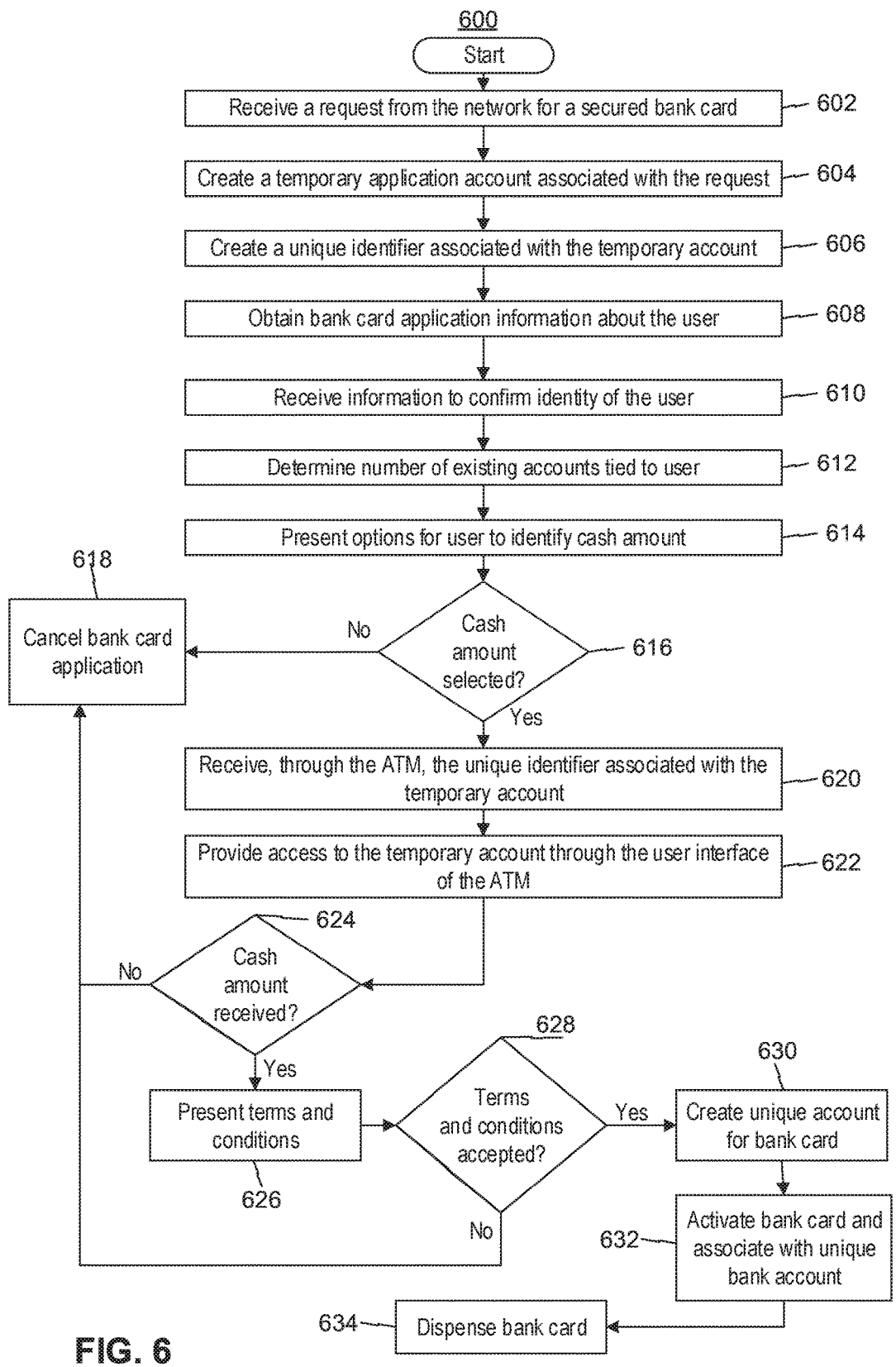
FIG. 6 is a flowchart of an exemplary method for an Automated Teller Machine to issue a secured bank card, consistent with embodiments of the present invention.

FIG. 6 is a flowchart of an exemplary method 600 for an ATM to issue a secured bank card, where part of the process is carried out through user device 300 and part of the process is carried out through ATM 200, from the perspective of server 400. Server 400 may be associated with card issuer 106. One or more steps of method 600 may be carried out through use of network 110. Certain steps of method 600 may be similar to steps of method 500, and references to the similar steps are made below.

At step 602, server 400 receives a request from user device 300 for a secured bank card to be issued by card issuer 106. In some embodiments, server 400 may receive the request from a website of card issuer 106. For example, user 104 may request a secured bank card through the website of card issuer 106 using a smartphone, e.g., user device 300. In another example, user 104 may login to a bank account associated with card issuer 106 on a laptop, e.g., user device 300, and make a request for a secured bank card. In another embodiment, server 400 may receive the request from an app associated with card issuer 106. For example, user 104 may make a request from a tablet, e.g., user device 300, on an app associated with card issuer 106. In this example, user 104 may be logged into a current bank account associated with card issuer 106 or be logged into the app as a guest.

At step 604, server 400 creates a temporary application account associated with the request for a secured bank card. The temporary account can be accessed at ATM 200, user device 300, or any other user device capable of being used for the secured bank card application. In some embodiments, the temporary account may be valid for a predetermined period of time. For example, server 400 may receive a request for a secured bank card from user device 300 and create a temporary account for the request. In this example, access to the temporary account may be limited to a 24-hour period. After the 24-hour period ends, the temporary account is deleted. In other embodiments, the time for keeping the temporary account open may be extended. By way of the last example, server 400 may receive a request for the temporary account to remain open for an additional 24 hours.

At step 606, server 400 creates a unique identifier associated with the temporary account. In some embodiments, the unique identifier allows user 104 to access the temporary account associated with the request for a secured bank card from any user device capable of being used for the secured bank card application. In some embodiments, the unique identifier may be valid for a predetermined period of time. For example, server 400 may receive a request for a secured bank card from user device 300 and create a temporary account for the request with a unique identifier for accessing the temporary account. In this example, the unique identifier may be valid for a 24-hour period. After the 24-hour period ends, the unique identifier is invalid. In other embodiments, the time for the validity of the unique identifier may be extended. By way of the last example, server 400 may receive a request for the unique identifier to remain valid for an additional 24 hours. In other embodiments, the unique identifier may remain valid for as long as the temporary account remains open. By way of the previous example, if the temporary account remains open for 24 hours, the unique identifier remains valid for the same 24 hours. The unique identifier may include an alpha-numeric passcode, a biometric passcode, a combination of the two, or any other type of known confidential access code.

At step 608, server 400 obtains bank card application information about the user. Step 608 may be carried out in a manner similar to steps 504 and 506 of method 500, except that at step 608 server 400 may receive the information about user 104 from user device 300. For example, server 400 may receive bank card information about user 104 obtained by user device 300 through the use of a webcam, questionnaire, existing bank account information, or the like. In some embodiments, server 400 may obtain bank card application information about user 104 through an app. For example, server 400 may receive information from an app installed on a mobile phone, e.g., user device 300, that requires user 104 to submit personal information.

At step 610, server 400 receives information necessary to confirm the identity of user 104. Step 610 may be carried out in a similar manner as step 508 of method 500. For example, server 400 may receive a photo of user 104 taken by a camera located on user device 300. In this example, server 400 may then compare the photo or video taken by the camera with the scan of user 104's identification. In another example, server 400 may transfer the photo or video taken of user 104 to a server associated with a known criminal database to check against existing facial scans. In other embodiments, if user device 300 is a mobile phone, server 400 may automatically receive the phone number associated with the mobile phone. As described for step 508 of method 500, the phone number may be used to confirm the identity of user 104.

In other embodiments, server 400 may compare the time and geographic location of applications made by user 104. Server 400 may determine if user 104 is the same user who applied for a previous application using the submitted identity. For example, if the identity of user 104 is associated with a first application at 2 PM in Los Angeles and a second application at 2:30 PM in New York City, ATM 200 may not confirm the identity of user 104 for the second application. In this example, the method may compare the geolocation of user device 300 used in each application, or the method may compare the location of ATM 200 where the activated secured bank card was dispensed for each application.

As described for step 508 of method 500, in some embodiments, when the identity of user 104 cannot be confirmed, server 400 may cancel the secured bank card application. In other embodiments, when the identity of user 104 cannot be confirmed, server 400 may put the application on hold and require user 104 to confirm their identity with card issuer 106. For example, server 400 may require user 104 to go to the nearest bank associated with card issuer 106 to confirm their identity. In another example, server 400 may require user 104 to call card issuer 106 to confirm their identity. In other embodiments, when the identity of user 104 is confirmed through biometric information, but matches the identity of a known criminal, server 400 may cancel the secured bank card application or require user 104 to carry out the application at a bank associated with card issuer 106. In other embodiments, server 400 may store the information for future reference.

At step 612, server 400 determines the number of accounts tied to user 104. Step 612 may be carried out in a similar manner as step 510 of method 500. In some embodiments, server 400 may check the confirmed identify of user 104 against other application requests. For example, server 400 may check biometric information entered by user 104 against biometric information entered in previous application requests. In other embodiments, server 400 may compare the time and geographic location of applications made by user 104. Server 400 may compare either the geolocation of user device 300 or the location of ATM 200 where the activated secured bank cards were dispensed for the other application.

As described for step 510 of method 500, in some embodiments of step 612, server 400 may cancel the secured bank card application when the number of accounts tied to user 104 is above a pre-determined number. For example, if the same biometric information or phone number is associated with user 104 for 10 accounts, user 104 will be tied to these 10 accounts and the current secured bank card application may be canceled. In other embodiments, server 400 may put the secured bank card application on hold and inform the user 104, through display screen 310 of user device 300, to either go to a bank associated with, or call, card issuer 106 to discuss the number of accounts tied to their identity. In other embodiments, where an identity associated with user 104 is tied to a predetermined number of accounts opened in a short period of time in a specific geographic location, server 400 may cancel the secured bank card application or put the application on hold.

Method 600 can proceed to step 614 if card issuer 106 approves the application. At step 614 server 400 presents to user 104, through display screen 310 of user device 300, with one or more options for a secured bank card that user 104 is qualified for based on the bank card application information, along with instructions to choose an option and the manner by which a cash amount required for the selected option may be remitted. Step 614 may be carried out in a similar manner as step 512 of method 500.

At step 616, server 400 may determine if a cash amount to be remitted has been selected. If a cash amount to be remitted has not been selected (step 616—No), then server 400 cancels the bank card application (step 618). If a cash amount to be remitted has been selected (step 616—Yes), then method 600 proceeds to step 620.

At step 620, server 400 receives, from ATM 200, the unique identifier associated with the temporary account. In some embodiments, the unique identifier received is the same unique identifier created in step 606. Server 400 may check the unique identifier to determine whether it is still valid. For example, server 400 may check to see if the predetermined time limit for using the unique identifier has expired. In this example, if the predetermined time limit has expired, the unique identifier is no longer valid. Although receiving the unique identifier is shown as step 620, in other embodiments the unique identifier may be received at earlier or later stages of method 600. For example, the unique identifier may be received prior to obtaining the bank card application information about user 104 (step 608), or after creating a unique account associated with the bank card (step 630). The only limitation on receiving the unique identifier associated with the temporary account is that it must be done prior to dispensing the activated secured bank card (step 634).

At step 622, server 400 provides access to the temporary account through user interface 210 of ATM 200. In some embodiments, when server 400 grants access to the temporary account, all the previous information submitted to server 400 may be uploaded to ATM 200. In this situation, any information entered into ATM 200 after this step will be transferred to server 400 following completion of the application. In other embodiments, ATM 200, similar to user device 300, may transfer information to server 400 where the account is stored, and receive further instructions from server 400. Similar to step 620, the temporary account may be accessed at different points in method 600. For example, the temporary account may be accessed prior to obtaining bank card application information (step 608), or after creating a unique account associated with the bank card (step 630). The only limitation on providing access to the temporary account is that it must be done prior to dispensing the activated secured bank card (step 634).

Although steps 620 and 622 are limited to receiving the unique identifier through ATM 200 and providing access to the temporary account through user interface 210 of ATM 200, in some embodiments the unique identifier may be received through a second user device and access to the temporary account may be provided through the user interface of that second user device. For example, user 104 may begin the application process on a smartphone, e.g., user device 300, and then, at some point during the application process, enter the unique identifier into a laptop and access the temporary account from there. In this example, server 400 may receive the unique identifier from the laptop and provide access to the temporary account through the user interface of the laptop. User 104 may then decide to switch to ATM 200 to dispense the bank card. In another example, user 104 may start the process on ATM 200 and then, at some point in the application process, enter the unique identifier into their smartphone and access the temporary account from there. In this example, server 400 may receive the unique identifier from the smartphone and provide access to the temporary account through the user interface of the smartphone. User 104 may then decide to switch back to ATM 200 to dispense the bank card. Alternatively, user 104 may decide to switch to a different ATM to carry out the final steps. In another example, user 104 may start the application process at ATM 200 and then, at some point during the application process, enter the unique identifier into a second ATM and access the temporary account from there. In this example, server 400 may receive the unique identifier from the second ATM and provide access to the temporary account through the user interface of the second ATM. This situation may occur when, for example, ATM 200 is out of blank bank cards or there is some other issue affecting the operability of ATM 200.

In some embodiments, when user 104 starts the process on user device 300, server 400 may provide instructions through display screen 310 of user device 300 as to where the nearest ATM containing a sufficient number of blank bank cards is located. In other embodiments, server 400 may provide instructions through display screen 310 of user device 300 as to where the nearest ATM not being used is located.

At step 624, server 400 determines if the cash amount selected to be remitted has been received. The cash amount may be received in a similar manner as described for step 518 of method 500. When the cash amount is received as a cash payment, server 400 may receive a notification from ATM 200 as to whether any of the bills received are suspected of having been used in illegal activity. In some embodiments, if ATM 200 provides a notification that the bills deposited are associated with illegal activity, server 400 may cancel the bank card application (step 618) and report the application to card issuer 106 or the police, or report the application to card issuer 106 or the police and allow user 104 to complete the application. If server 400 determines that the cash amount selected to be remitted has not been received (step 624—No), method 600 cancels the bank card application (step 618). If server 400 determines that the cash amount selected to be remitted has been received (step 624—Yes), then method 600 proceeds to step 626.

In some embodiments, when the cash amount is remitted by e-transfer from a separate bank account, server 400 may notify user 104 when the e-transfer has been completed. For example, if user 104 is carrying out the application on a smartphone, e.g., user device 300, and transfers the money from a separate bank account, server 400 may provide a notification via app, text, or e-mail informing user 104 that the cash transfer has gone through and the application process can be continued.

At step 626, server 400 presents the terms and conditions to user 104 through user interface 210 of ATM 200. The terms and conditions may be presented in a similar manner as described for step 520 of method 500. As with step 520 of method 500, although presenting the terms and conditions is shown as step 626 of method 600, in other embodiments, the terms and conditions may be presented at earlier stages of the process. For example, the terms and conditions may be presented before a cash amount is received (step 624) or a cash amount is selected (step 616). At step 628, server 400 determines if the terms and conditions have been accepted. If the terms and conditions have not been accepted (step 628—No), the bank card application is cancelled (step 618). If the terms and conditions have been accepted (step 628—Yes), method 600 proceeds to step 630.

At step 630, server 400 creates a unique account for the secured bank card. Step 630 is carried out using the bank card application information submitted and the secured bank card requested. At step 632, server 400 associates the unique bank account with the newly activated secured bank card. The secured bank card may be activated by ATM 200. As described for step 524 of method 500, the number on the newly activated secured bank card may then be associated with the unique account.

At step 634, server 400 provides instructions for ATM 200 to dispense the newly activated secured bank card. The card may be dispensed in a similar manner to that described for step 528 of method 500.

Figure 7:
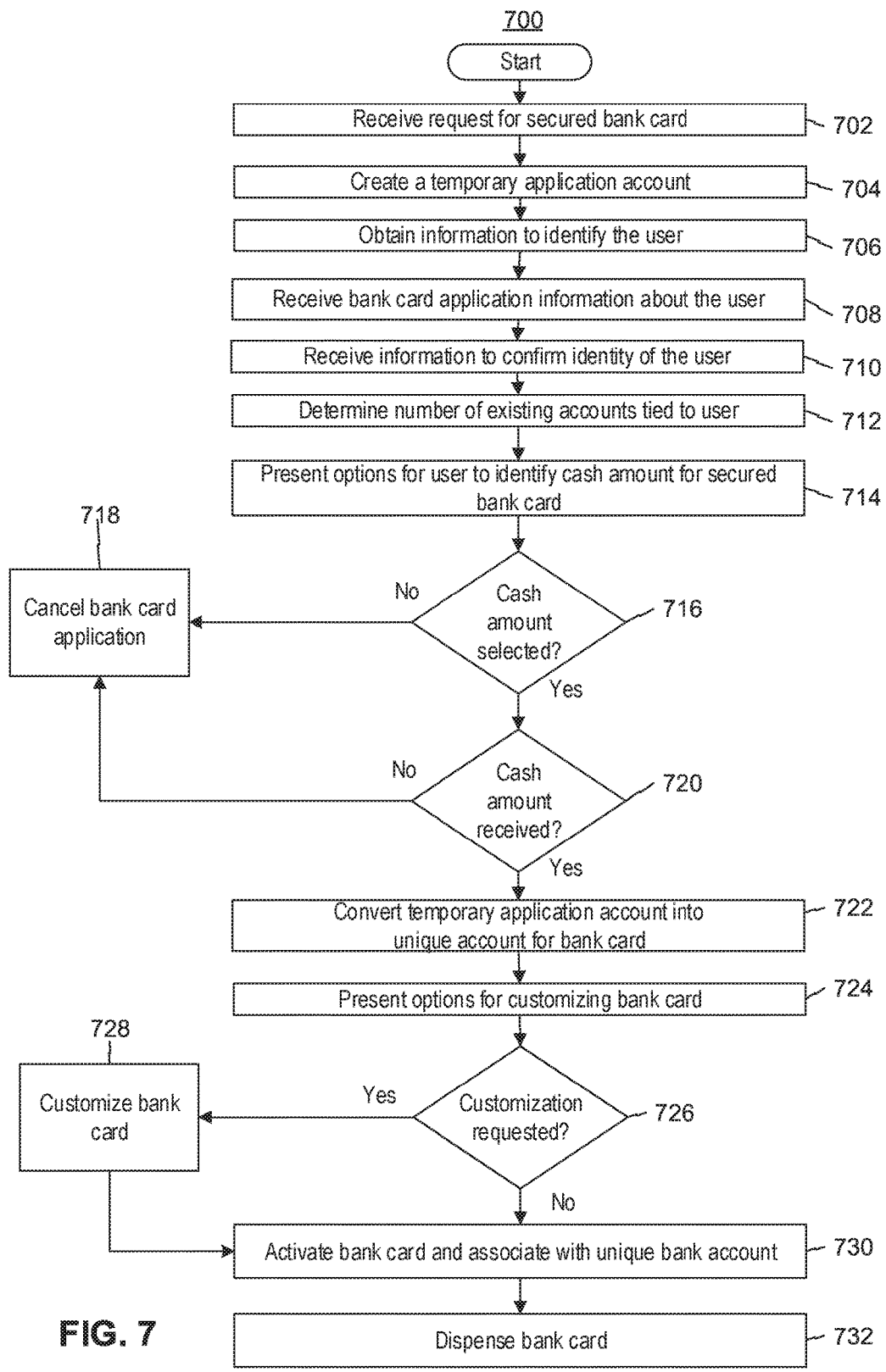
FIG. 7 is a flowchart of an exemplary method for an Automated Teller Machine to issue a secured bank card, consistent with embodiments of the present invention.

FIG. 7 is a flowchart of an exemplary method 700 for an ATM to issue a secured bank card, where the user carries out the entire process by interaction with ATM 200. Method 700 may be implemented by, for example, processor 202 and user interface 210 of ATM 200 (FIG. 2). Certain steps of method 700 are similar to steps of methods 500 and 600. Where applicable, reference is made to the similar steps.

At step 702, ATM 200 receives a request from user 104 through user interface 210 for a secured bank card to be issued by card issuer 106. This step may be carried out in a similar manner as described for step 502 of method 500.

At step 704, ATM 200 creates a temporary application account associated with the user and the request for a secured bank card. In some embodiments, the temporary account may be valid for a predetermined period of time. For example, the temporary account may be valid for 1 hour, or for 24 hours. In other embodiments, the temporary account may only be valid while user 104 is using ATM 200. For example, if user 104 requests a secured bank card at ATM 200, ATM 200 may then create a temporary application account that is valid for user 104's single application session. In this example, if user 104 closes the application for any reason, then the secured bank card application is cancelled. In other embodiments, the temporary application account and the information submitted to the account is transferred to a server associated with card issuer 106, e.g., server 400. In this situation, similar to step 606 of method 600, ATM 200 may provide, to user 104, a unique identifier associated with the temporary account.

At step 706, ATM 200 determines if user 104 previously submitted application information for a secured bank card, and if user 104 did not previously submit application information, ATM 200 determines if user 104 is a current customer of card issuer 106. Step 706 may be carried out in a similar manner as described for step 504 of method 500. At step 708, ATM 200 obtains bank card application about user 104. Step 708 may be carried out in a similar manner as described for step 506 of method 500. At step 710, ATM 200 receives information necessary to confirm the identity of user 104. Step 710 may be carried out in a similar manner as described for step 508 of method 500. At step 712, ATM 200 determines the number of accounts tied to user 104. Step 712 may be carried out in a similar manner as described for step 510 of method 500. Method 700 can proceed to step 714 if card issuer 106 approves the application. At step 714, ATM 200 presents user 104, through user interface 210, with one or more options for a secured bank card that user 104 is qualified for based on the bank card application information, along with instructions to choose an option and the manner by which a cash amount required for the selected option may be remitted. Step 714 may be carried out in a similar manner as described for step 512 of method 500.

At step 716, ATM 200 determines if a cash amount to be remitted has been selected. If no cash amount to be remitted is selected (step 716—No), the bank card application is cancelled (step 718). If a cash amount to be remitted has been selected (step 716—Yes), then at step 720 ATM 200 determines if the cash amount has been received. If the cash amount has not been received (step 720—No), the bank card application is cancelled (step 718). If the cash amount has been received (step 720—Yes), then method 700 proceeds to step 722.

At step 722, ATM 200 converts the temporary application account into a unique account for the secured bank card. In some embodiments, ATM 200 may transfer the temporary application account, with all the entered information, from ATM 200 to a server associated with card issuer 106, e.g., server 400. Server 400 may convert the temporary account into a unique account for the secured bank card and transfer the unique account information back to ATM 200. In other embodiments, ATM 200 may convert the temporary application account into a unique account for the secured bank card, and then ATM 200 may transfer the information about the newly created unique account to server 400. In embodiments where a unique identifier was provided to user 104 to access the temporary account, ATM 200 may prompt user 104, through user interface 210, to create a new identifier for the unique account. In other embodiments, ATM 200 may turn the unique identifier given into the new identifier for the unique account.

At step 724, ATM 200 presents, through user interface 210, one or more options for user 104 to customize the secured bank card with instructions to select among the one or more customization options. In some embodiments, ATM 200 may present the option of choosing a temporary bank card or customizing a bank card at ATM 200. User 104 may not choose a blank bank card as a permanent card because a secured card must have at least the requisite account number, e.g., a 16-digit number, associated with it, the expiration date, and user 104's name. In some embodiments, blank bank cards may be provided by card issuer 106 and loaded into ATM 200 with an account number already engraved into the card. In other embodiments, cards with specific designs may be provided by card issuer 106 and loaded into ATM 200. In such embodiments, ATM 200 may be configured to hold different groups of cards. In other embodiments, ATM 200 may provide options for a customizable design in addition to user 104's name and other necessary information. For example, ATM 200 may provide user 104 with the option to engrave a logo, such as a sport's team logo, onto the secured bank card in addition to user 104's name and other necessary information.

At step 726, ATM 200 determines if user 104 has made a customization request from the one or more options presented. If a customization request has not been made (step 726—No), method 700 proceeds directly to step 730. If a customization request has been made (step 726—Yes), method 700 proceeds to step 728.

At step 728, ATM 200 customizes the secured bank card with the requested customization. To carry out the customization, ATM 200 may be equipped with card customization equipment 212. Card customization equipment 212 may include an embosser, a laser engraver, or any other equipment capable of customizing a bank card. In some embodiments, when ATM 200 does not contain any customization equipment, or if card customization equipment 212 is not working, ATM 200 may provide to user 104, through user interface 210, information on the location of an ATM that can carry out the customization.

At step 730, ATM 200 activates the secured bank card and associates the activated secured bank card with the unique account created at step 722. Step 730 may be carried out in a similar manner as described for step 526 of method 500. At step 732, ATM 200 dispenses the activated secured bank card. Step 732 may be carried out in a similar manner as described for step 528 of method 500.

Embodiments of the present disclosure also relate to methods and computer-readable media that implement the above embodiments.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. The systems and methods disclosed herein relate to an Automated Teller Machine that issues secured credit cards, however the systems and methods may be modified to allow user 104 to manage the secured bank card at ATM 102 or user device 108. For example, user 104 may use ATM 102 or user device 108 to make payments on the secured bank card or to apply for an increased credit limit on the secured bank card. Furthermore, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. An Automated Teller Machine for issuing a secured bank card, comprising:
 a user interface;
 one or more memories storing instructions; and one or more processors configured to execute the instructions to perform operations comprising:
receiving, via the user interface, a request from a user for a secured bank card to be issued by a card issuer;
obtaining information to determine the identity of the user, the obtained information comprising bank card application information and a number of existing accounts with the card issuer associated with the user;
confirming the identity of the user based on the obtained information;
transmitting, to a server associated with the card issuer, the obtained information associated with the confirmed identity;
receiving, from the server associated with the card issuer, one or more options for a secured bank card the user is qualified for based on the bank card application information and the number of existing accounts with the card issuer;
presenting to the user, via the user interface, the one or more options with instructions for the user to select among the one or more options for the secured bank card to be issued and a manner by which a cash amount required for the selected option can be remitted;
approving, upon receipt of the cash amount for the selected option, issuance of the secured bank card, wherein when the cash amount is deposited via cash deposit, the operations further comprise:
scanning each currency bill deposited;
determining whether each currency bill has been involved in an illegal activity; and
reporting, to the server associated with the card issuer, the cash deposit associated with the illegal activity based on the determination whether one or more deposited currency bills have been involved in illegal activity;
creating a unique account for the secured bank card;
activating the secured bank card and associating the activated bank card with the unique account; and
dispensing, if banks cards are available in the Automated Teller Machine, the activated bank card to the user.

2. The Automated Teller Machine of claim 1, wherein user input is received through the user interface of the Automated Teller Machine.

3. The Automated Teller Machine of claim 1, wherein at least one user input is received through a user interface of a second user device.

4. The Automated Teller Machine of claim 3, wherein the operations further comprise:
providing, through the user interface of the second user device, an access code associated with the user;
receiving, at the user interface of the Automated Teller Machine, the access code associated with the user;
providing access to an application for a secured bank card associated with the user.

5. The Automated Teller Machine of claim 1, wherein confirming the identity of the user is based on biometric information.

6. The Automated Teller Machine of claim 1, wherein the operations further comprise:
determining that one or more existing accounts are tied to the user;
determining, by accessing the server associated with the card issuer, the geographic location of where each existing account tied to the user was created;
determining, by accessing the server associated with the card issuer, the date and time at which each existing account tied to the user was created; and
terminating processing of the user request for a secured bank card when the existing accounts tied to the user were created within a predetermined geographic location and time.

7. The Automated Teller Machine of claim 1, wherein a portion of the obtained information is received by way of a video camera.

8. The Automated Teller Machine of claim 1, wherein the operations further comprise disabling the operation of receiving a request a secured bank card when there are no available bank cards.

9. The Automated Teller Machine of claim 1, wherein the operations further comprise:
obtaining a phone number associated with the user;
transmitting, to a server associated with a service provider for the phone number, a request for authentication of the phone number;
obtaining, from the server associated with the service provider associated with the phone number, a response regarding the authentication of the phone-number; and
based on the response, granting or denying the request for a secured bank card.

10. The Automated Teller Machine of claim 1, wherein the activated bank card is a temporary bank card.

11. The Automated Teller Machine of claim 1, wherein the operations further comprise providing instructions to the user, via the user interface, on how to receive a permanent bank card associated with the unique account.

12. The Automated Teller Machine of claim 1, wherein the operations further comprise:
prompting the user, via the user interface, to read and accept or deny the terms and conditions associated with the bank card;
receiving, via the user interface, a response to the terms and conditions; and
based on the response, granting or denying the request for a secured bank card.

13. A method for issuing a secured bank card through an Automated Teller Machine, comprising:
receiving, at the Automated Teller Machine, a request from a user for a secured bank card to be issued by a card issuer;
obtaining information to determine the identity of the user, the obtained information comprising bank card application information and a number of existing accounts with the card issuer associated with the user;
confirming the identity of the user based on the obtained information;
transmitting, to a server associated with the card issuer, the obtained information associated with the confirmed identity;
receiving, from the server associated with the card issuer, one or more options for a secured bank card the user is qualified for based on the bank card application information and the number of existing accounts with the card issuer;
presenting to the user the one or more options with instructions for the user to select among the one or more options for the secured bank card to be issued and manner by which a cash amount required for the selected option can be remitted;
approving, upon receipt of the cash amount for the selected option, issuance of the secured bank card, wherein the cash amount is deposited via cash deposit and the operations further comprise:

scanning each currency bill deposited;

determining whether each currency bill has been involved in an illegal activity; and reporting, to the server associated with the card issuer, the cash deposit associated with the illegal activity based on the determination whether one or more deposited currency bills have been involved in illegal activity;

creating a unique account for the secured bank card;

activating the secured bank card stored in the Automated Teller Machine and associating the activated bank card with the unique account; and dispensing, if banks cards are available in the Automated Teller Machine, the activated bank card to the user.

14. The method of claim 13, wherein a portion of the obtained information is received by way of a video camera.

15. The method of claim 13, wherein confirming the identity of the user is based on biometric information.

16. The method of claim 13, wherein the operations further comprise disabling the operation of receiving a request a secured bank card when there are no available bank cards.

17. The method of claim 13, wherein when the user is a current customer, the obtained information is provided by the card issuer.

18. The method of claim 17, further comprising:

prompting the user, via the user interface, to read and accept or deny the terms and conditions associated with the bank card;

receiving, via the user interface, a response to the terms and conditions; and based on the response, granting or denying the request for a secured bank card.

19. A non-transitory computer-readable medium containing program instructions which, when executed by one or more processors, cause the one or more processors to provide a system for issuing a secured bank card through an Automated Teller Machine by performing operations comprising:

receiving, via the user interface, a request from a user for a secured bank card to be issued by a card issuer;

obtaining information to determine the identity of the user, the obtained information comprising bank card application information and a number of existing accounts with the card issuer associated with the user;

confirming an identity of the user based on the obtained information;

transmitting, to a server associated with the card issuer, the obtained information associated with the confirmed identity;

receiving, from the server associated with the card issuer, one or more options for a secured bank card the user is qualified for based on the bank card application information and the number of existing accounts with the card issuer;

presenting to the user the one or more options with instructions for the user select among the one or more options for the secured bank card to be issued and manner by which a cash amount required for the selected option can be remitted;

approving, upon receipt of the cash amount for the selected option, issuance of the secured bank card, wherein when the cash amount is deposited via cash deposit, the operations further comprise:

scanning each currency bill deposited;

determining whether each currency bill has been involved in an illegal activity; and reporting, to the server associated with the card issuer, the cash deposit associated with the illegal activity based on the determination whether one or more deposited currency bills have been involved in illegal activity;

creating a unique account for the secured bank card;

activating the secured bank card and associating the activated bank card with the unique account; and dispensing, if banks cards are available in the Automated Teller Machine, the activated bank card to the user.

* * * * *